United States Patent [19]

Clark et al.

[11] Patent Number: 4,533,080

[45] Date of Patent: Aug. 6, 1985

[54] AIR TERMINAL—AIR HANDLER INTERFACE

[75] Inventors: William E. Clark, Syracuse; James Carucci, Fayetteville, both of N.Y.

[73] Assignee: Carrier Corporation, Syracuse, N.Y.

[21] Appl. No.: 691,730

[22] Filed: Jan. 16, 1985

Related U.S. Application Data

[63] Continuation of Ser. No. 528,813, Sep. 2, 1983, abandoned.

[51] Int. Cl.³ .............................................. F24F 7/00
[52] U.S. Cl. ........................................ 236/49; 165/22
[58] Field of Search ............................. 236/49; 165/22

[56] References Cited

U.S. PATENT DOCUMENTS

| | | | |
|---|---|---|---|
| 3,727,835 | 7/1971 | Rifkin et al. | 236/49 |
| 4,009,825 | 3/1977 | Coon | 165/22 X |
| 4,182,484 | 1/1980 | Stanke et al. | 236/49 X |
| 4,297,899 | 11/1979 | Blaney et al. | 73/861.58 |

Primary Examiner—William E. Wayner
Assistant Examiner—John M. Sollecito
Attorney, Agent, or Firm—David J. Zobkiw

[57] ABSTRACT

In each zone of a variable volume air distribution system, terminal satisfaction is determined. Responsive to the determination of the number of dissatisfied terminals, the air handling unit is controlled to minimize the output of the air handling unit while providing a predetermined degree of terminal satisfaction. The determination of the satisfaction of the terminals is based upon a direct or indirect sensing of temperature in the zones.

5 Claims, 8 Drawing Figures

AIR TERMINAL—AIR HANDLER INTERFACE

This application is a continuation of application Ser. No. 528,813 filed on Sept. 2, 1983 and now abandoned.

BACKGROUND OF THE INVENTION

In conventional variable air volume (VAV) systems which are capable of variable output by varying the fan speed, positioning the inlet guide vanes or by controlling the pitch of an axial fan, fan control is achieved through the use of a single pressure sensor which is located somewhere in the main duct line. The pressure sensor sends an input directly to the fan control such as a variable speed drive of an air handler unit to cause the speed to increase, decrease or remain constant. Thus, if the pressure at the sensor location is too high, a "decrease" signal is sent and, if it is too low, an "increase" signal is sent. The location of the sensor is carefully chosen in order that the pressure sensed is most closely representative of the overall system pressure distribution over the whole load range. Ordinarily, the sensor location chosen is about two thirds of the way down the main duct as measured by distance or total pressure drop. Space temperatures are not used to control fan speed. Instead, the sensed pressure is fed back to the speed changer through a parallel summing junction/function generator control process. The speed changer alters fan speed and thereby fan outlet pressure. There is a pressure loss in the remaining main/common duct downstream of the pressure sensor. The duct system splits up the flow, losing more pressure in the branches, is delivered to a VAV terminal control loop which imposes a controlled pressure loss and ultimately influences the space temperature. Thus, although temperature is the variable to be controlled, all of the controls are pressure responsive, and a single pressure sensor is used. So, even if the pressure sensor is located at the point where the sensor will give the "best" representation of the overall duct pressure distribution at design flow, when there is off design flow and when the VAV terminals on one side of the duct system close off, however, the "best" spot changes to another location. As a result, the sensor may be inaccurate in its representation of duct pressure distribution under off-design conditions as well as those due to normal changes during the day.

Independent of how well placed it is, a single sensor provides a single reading and it is not an average or otherwise influenced by measurements taken at other locations. Because of this, a single reading cannot give the variable speed control a good view of what is required in the duct under all conditions. Since a full view is not provided, this approach is inherently inaccurate under at least some operating conditions. In addition, in order to compensate for inaccuracies, the building operator generally sets the one pressure sensor at a "fat" setting so as to put a comfort factor in and thereby avoid occupant complaints but at the expense of greater energy usage.

SUMMARY OF THE INVENTION

In a VAV system employing an air terminal—air handler (AT/AH) interface controller, fan volume control is achieved as a result of direct or indirect temperature sensing rather than pressure sensing. Temperature sensing can be direct by sensing the set point and actual zone temperature or indirect by sensing a temperature related condition such as the position of the bleed plate of a bleed thermostat. Unlike conventional systems, a number of sensor locations are used and, while an individual sensor or transducer may be in a poor location due to current system conditions or sensor accuracy range, a plurality of sensor inputs are received by the AT/AH interface controller. Based upon the information received from the plurality of sensors/transducers, in the duct system, the AT/AH controller makes a decision and sends a corresponding directive to the air handler to cause the fan to maintain the current speed, speed up or slow down. The decision, however is based upon whether or not temperature requirements are satisfied in a plurality of locations, not in response to a single sensed pressure.

It is an object of this invention to achieve a greater fan energy savings through more responsive fan output control.

It is a further object of this invention to provide more information to an AT/AH interface controller and thereby better matching of fan output to demand.

It is an additional object of this invention to permit an air handling unit to run at lower speeds or power settings, when appropriate, thus saving energy.

It is a further object of this invention to provide an algorithm for taking information from a plurality of thermostatic transducers/sensors, making decisions and controlling the speed of an air handler input responsive thereto. These objects, and the others as will become apparent hereinafter, are accomplished by the present invention.

Basically, temperature is sensed directly or indirectly at selected terminals in the system. Digitized signals representing either a satisfied or unsatisfied condition are sent to the control logic where a decision is made, based upon an algorithm, to increase, decrease or hold the fan speed. This decision signal is sent to the speed changer to change the fan speed, as required. The change in the fan speed causes a change in flow and thereby changes the cooling/heating delivered to the spaces.

BRIEF DESCRIPTION OF THE DRAWINGS

For a fuller understanding of the present invention, reference should now be made to the following detailed description thereof taken in conjunction with the accompanying drawings wherein.

DESCRIPTION OF THE PREFERRED EMBODIMENTS

Figure 1:
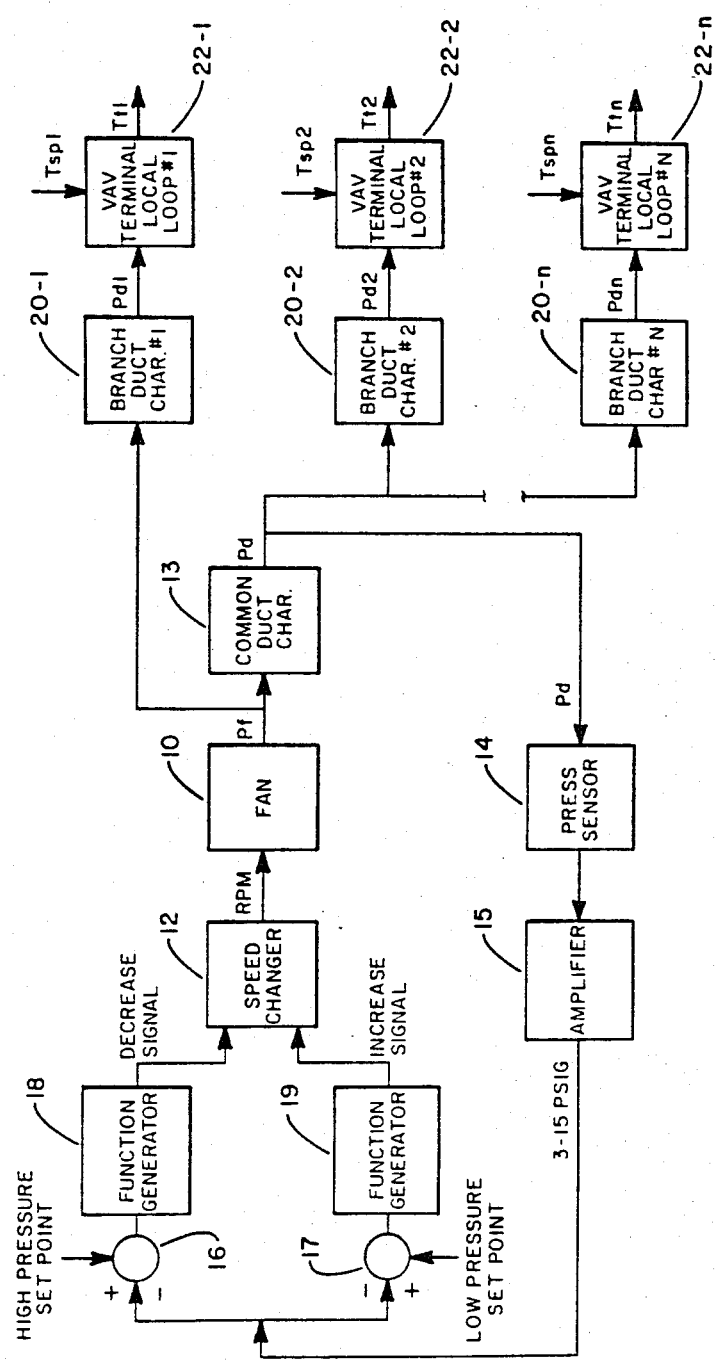
FIG. 1 is a functional block diagram of a prior art control system.

In FIG. 1 a prior art system is represented in which a fan 10 is driven at a variable speed by speed changer 12. At the outlet of the fan the pressure in the duct is Pf which drops with distance to a duct pressure of Pd at some point in the common duct, and drops to branch duct pressures of Pd1, Pd2, . . . Pdn at some point in the various branches leading to terminals 1 to n, respectively. A common duct characteristic represented by box 13 denotes the physical properties of the common duct with respect to the air flow therethrough. A location representative of the conditions in the entire duct is chosen and this location, which corresponds to the duct pressure of Pd, is usually about two thirds of the way down the common duct, as measured by distance or total duct pressure drop, and intermediate the various branch ducts. The duct pressure, Pd, is sensed at the selected location by pressure sensor 14, amplified by amplifier 15 and a 3–15 psig signal represenstive thereof is supplied as an inlet to summing junctions 16 and 17. A second input representative of a high pressure set point is supplied to summing junction 16 and, if the signal from pressure sensor 14 via amplifier 15 is greater than the signal representative of the high pressure set point, a positive signal is supplied to function generator 18 which, in turn, sends an electrical signal to speed changer 12 instructing it to decrease the speed of the fan 10. In a typical function generator, no signal is given until a certain level input signal is received, e.g. the signal from amplifier 15 must be greater than the high pressure set point for function generator 18 to furnish a signal to speed changer 12.

Similarly, a second input representative of a low pressure set point is supplied to summing junction 17 and, if the signal from pressure sensor 14 via amplifier 15 is less than the signal representative of the low pressure set point, a negative signal is supplied to function generator 19 which, in turn, sends an electrical signal to speed changer 12 instructing it to increase the speed of fan 10. The output of fan 10 is ultimately supplied to a plurality of branch ducts, each having their own duct characteristic represented by boxes 20-1, 20-2, . . . 20-n denoting the physical properties of the respective branch ducts by pressures Pd1, Pd2 . . . Pdn. (Note that branch duct #1, 20-1, is illustrated as branching off upstream of the location of pressure Pd.) Each branch has at least one VAV terminal local loop, numbered 22-1 to n, respectively, each receiving a temperature set point, Tsp1 to Tspn, respectively. The VAV terminal local loops 22-1 to n physically comprise the terminals responsive to the respective temperature set points Tsp1 to Tspn and the actual zone temperatures. The VAV terminal loops 22-1 to n control the flow of conditioned air from terminals 1 to n to the rooms or zones. In a typical VAV terminal local loop, the conditioned air passes into the room or zone by passing through an opening formed between two inflatable bellows in the terminal. The bellows are supplied with duct air via a pressure regulator and the degree of inflation, and thereby the opening size, is controlled by a bleed thermostat which bleeds the bellows inflation air to the atmosphere at a controlled rate according to the bleed thermostat set point and room/zone temperature. The resultant zone temperatures for each zone are Tt1, Tt2, . . . Ttn, respectively.

From the foregoing description of the FIG. 1 system it follows that the only feedback from the terminals to fan 10 and speed changer 12 is indirectly through the cumulative changes in duct pressure Pd due to the action of VAV terminal loops 1 to n in controlling air flow in the individual terminals by controlling the inflation of the various bellows. It is the cumulative effect of VAV terminal loops 1 to n and the speed of fan 10 which results in Pd. This cumulative effect is, however, not responsive to individual terminal conditions and the pressure Pd is, often, an incorrect representation of system needs.

Figure 2:
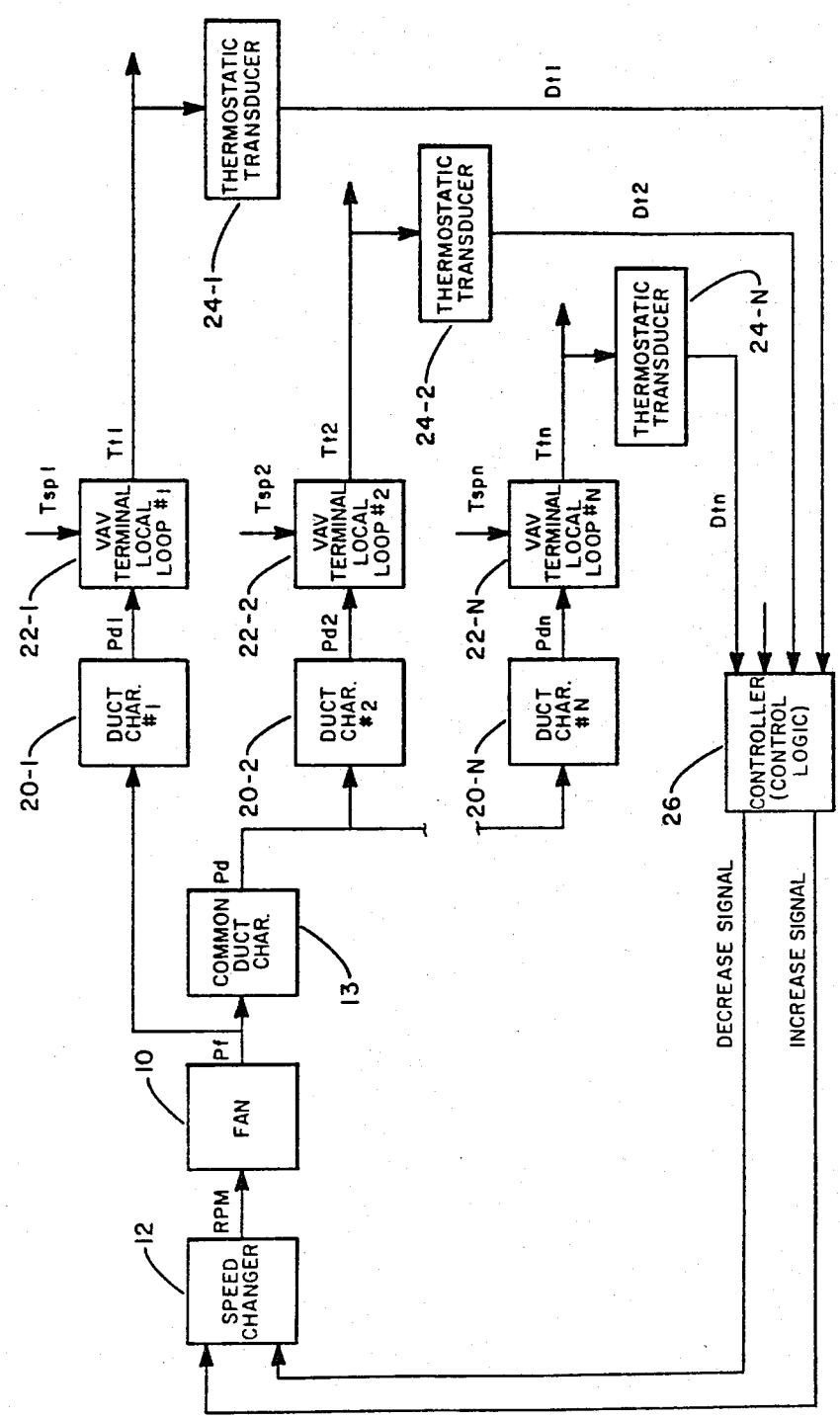
FIG. 2 is a functional block diagram of the control system of the present invention.

In FIG. 2, starting with speed changer 12, fan 10 and continuing through VAV terminal local loops 22-1 to n, the control system is the same as that of FIG. 1 except for the absence of pressure sensor or transducer 14. The resultant zone temperatures of Tt1 . . . Ttn, respectively, act on thermostatic tranducers 24-1, 24-2 . . . 24-n which are located in selected terminals. The transducers 24-1, 24-2 . . . 24-n produce binary form digital signals Dt1, Dt2 . . . Dtn, indicating terminal temperature satisfaction or not, which are supplied as inputs to controller 26. A terminal is considered to be satisfied unless the bleed thermostat is fully open, to cause maximum bellows opening, implying that the zone temperature is greater than the set point in the cooling mode or less than the set point in the heating mode. The controller 26 contains control logic which acts in response to these inputs to send an increase signal, a decrease signal or no signal to the speed changer 12 to increase, decrease or maintain the fan speed. The controller 26 periodically samples the input signals to permit the system to respond to corrections.

In comparing the systems of FIG. 1 and 2 it is apparent that: (1) the FIG. 2 system tests the zone temperatures at the VAV terminal local loops 22-1 to n rather than the main duct pressure upstream of at least some of the VAV terminal local loops 22-1 to n; (2) the FIG. 2 system uses a plurality of temperature sensors rather than a single pressure sensor; and (3) the FIG. 2 system uses a control logic based upon zone conditions for all of the zone rather than a single main duct sensor that may or may not be currently representaive of system conditions.

Figure 3:
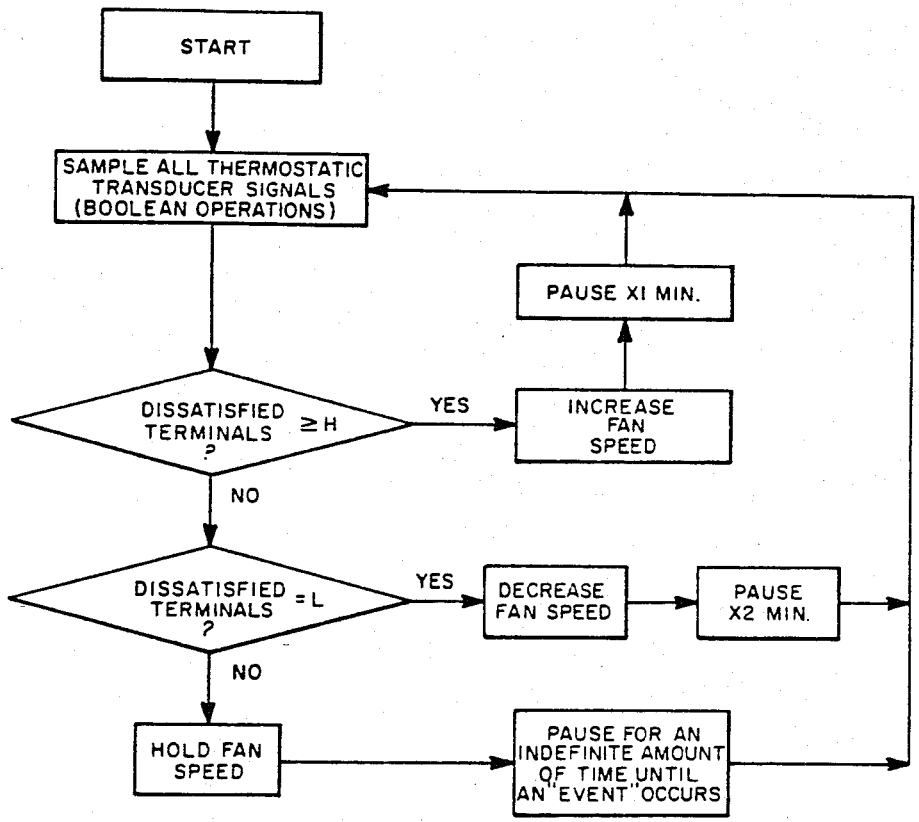
FIG. 3 is a flow diagram showing the operation of the control logic.

The control logic of controller 26 processes the signals Dt1, Dt2 . . . Dtn as set forth in FIG. 3. More specifically, the process starts by the controller sampling all of the thermostatic transducer signals Dt1, Dt2 . . . Dtn in the duct system. All of the signals are compared with each other in a series of Boolean operations in order to determine how many of the transducers are in air spaces which are not satisfied i.e. need more heating/cooling. The number of dissatisfied spaces is determined and if it is at or past a set high limit, H, the controller 26 sends a signal to the fan 10 to increase speed by a predetermined increment and, after a pause of X1 minutes, returns to START and initiates the decision process over again. If the number of dissatisfied terminals is less than H, the controller then checks to see if the number of dissatisfied spaces is equal to, or less than, a set low limit, L and, if so, the controller sends a signal to the fan to decrease fan speed by a predetermined increment and, after a pause of X2 minutes returns to START and initiates the decision process over again. If the number of dissatisfied terminals is more than L but less than H, no fan speed control signal is sent and the controller pauses for an indefinite amount of time until an "event", in the form of the sensing of a change in status of any of the transducers, occurs. When the change in status of a terminal to/from satisfied is sensed the controller returns to START and initiates the decision process over again.

Figure 4:
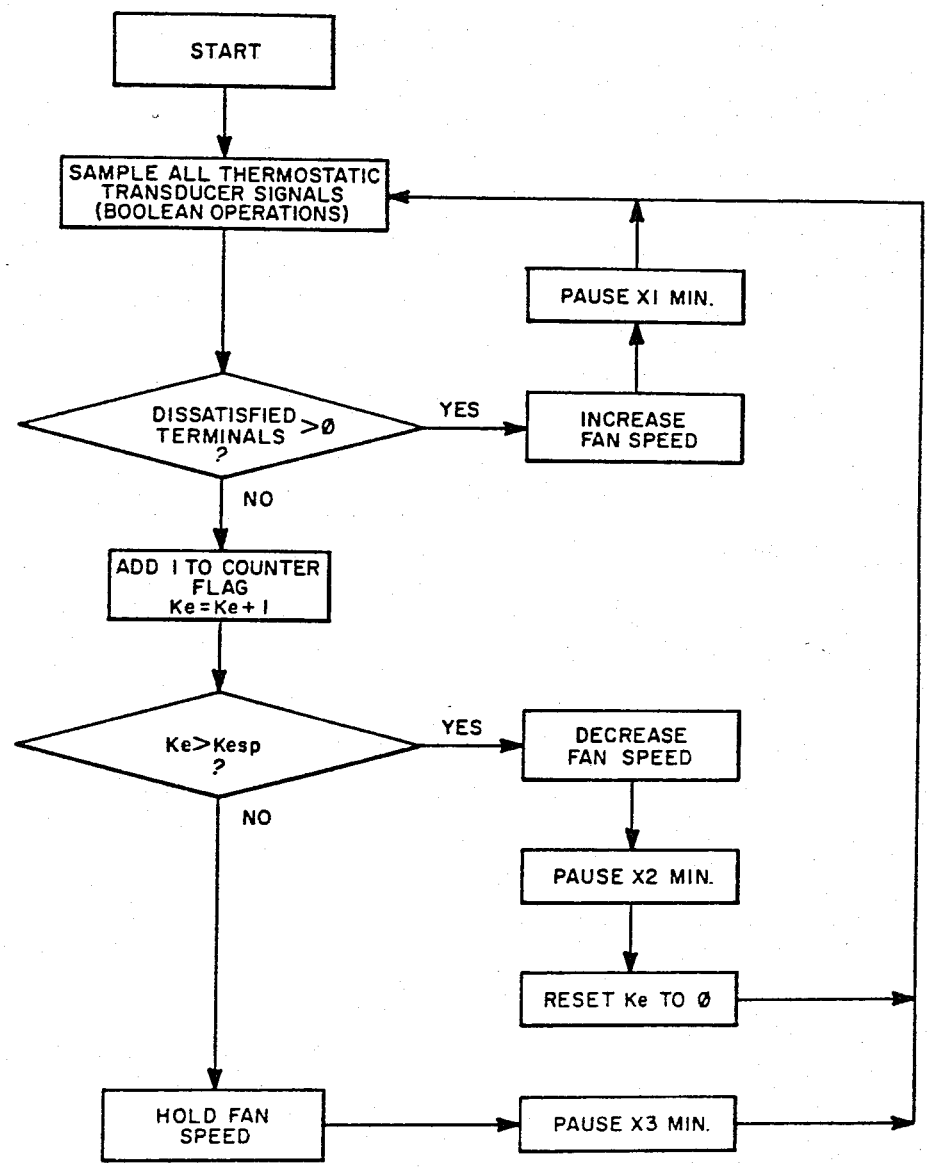
FIG. 4 is a flow diagram showing an alternative operation of the control logic.

An alternative control logic function is illustrated in FIG. 4. As in the embodiment of FIG. 3, the process starts by the controller sampling all of the thermostatic transducer signals in a series of Boolean operations. If any of the terminals are not satisfied, the controller 26 sends a signal to the fan 10 to increase speed by a predetermined increment and, after a pause of X1 minutes, returns to START and initiates the decision process over again. If none of the terminals are dissatisfied, then 1 is added to the counter flag, Ke, and Ke is compared with Kesp, the counter set point. If Ke is greater than Kesp, then the controller 26 sends a signal to the fan 10 to decrease speed by a predetermined increment and, after a pause of X2 minutes, resets Ke to $\phi$, returns to START and initiates the decision process over again. If there are no dissatisfied thermostats and Ke is not greater than Kesp then the fan speed is held and, after a pause of X3 minutes, the controller returns to START and initiates the decision process again. In this embodiment, when all of the terminals are satisfied the fan speed is maintained for a number of time periods, each of a duration of X3 minutes, determined by the value of Kesp, before the fan speed is decreased. This approach reduces the cycling of the fan speed when the system is at or near the bare minimum.

Figure 5:
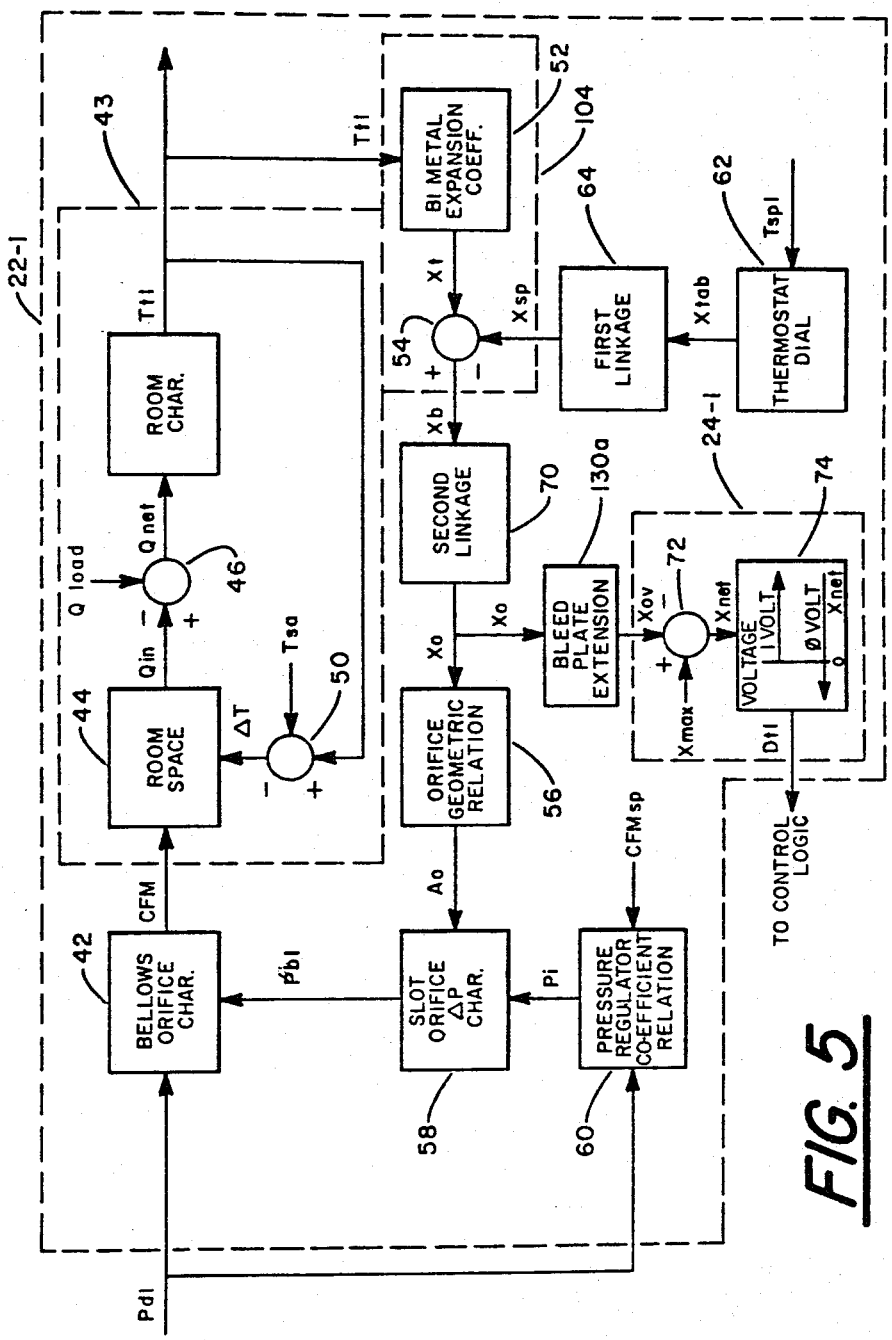
FIG. 5 is a functional block diagram of a VAV terminal local control loop.

The details of exemplary VAV terminal local control loop 22-1 of FIG. 2 is illustrated in greater detail in FIG. 5. However, FIG. 5 generally illustrates each of the VAV terminal local control loops 22-1 to n of the FIG. 2 embodiment. As evident from the foregoing description, the transducer 24-1 supplies information about the temperature in the airspace to the AT/AH interface controller 26. The controller 26 takes this information from transducers 24-1 to n, makes a decision and sends a directive to the speed changer to hold, increase or decrease the fan speed. In this manner, the controller 26 is provided with information as to the duct system's temperature diversity in order to provide the basis for an intelligent decision.

Figure 6:
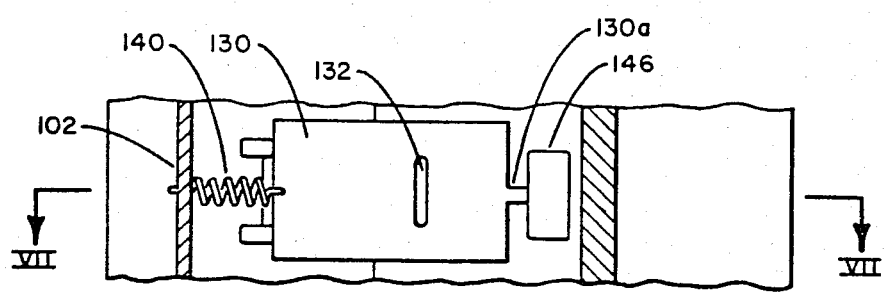
FIG. 6 is a top view of a thermostatic transducer.
Figure 7:
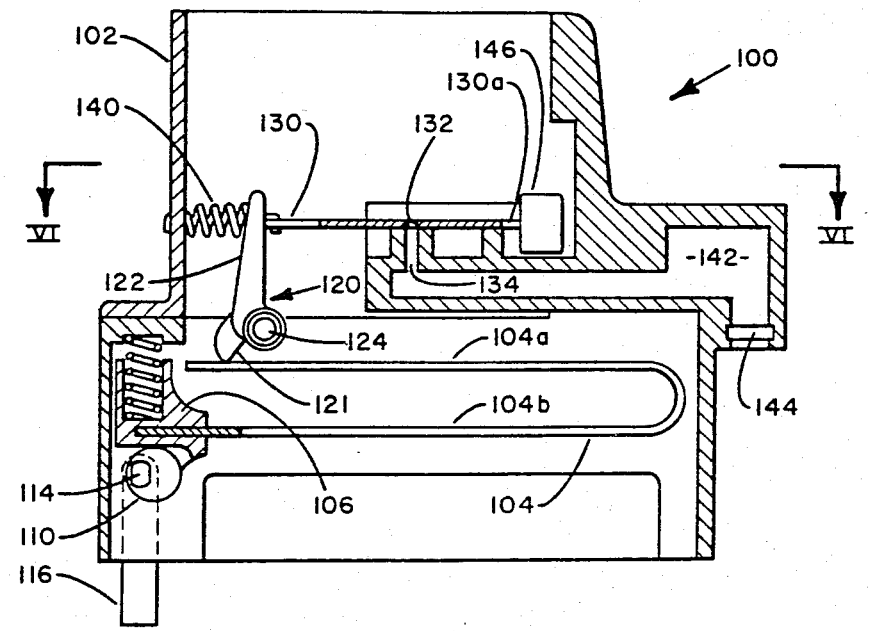
FIG. 7 is a sectional view taken along line VII—VII of FIG. 6.

In FIGS. 6 and 7 the numeral 100 generally designates a thermostat including a thermostatic transducer. As is conventional, the thermostat 100 includes a housing 102 having an opening formed in the lower portion thereof for passage of room air therethrough into the interior of the housing. A "U" shaped bimetallic element 104 is mounted within housing 102 on an adjustment block 106. In order to assure maximum contact of room air with the bimetallic element 104 and to provide a bimetallic element large enough to actuate the movable members of the thermostatic transducer 100, bimetallic element 104 is preferrably provided with a plurality of perforations (not illustrated) extending throughout its axial length in legs 104a and b thereof. By providing the perforations, the width of bimetallic element 104 can be made only slightly less than the interior of housing 102.

The adjustment block 106 which mounts bimetallic element 104 is slidably mounted within housing 102 for vertical movement relative thereto. Spring 108 provides a bias to block 106 against temperature adjustment cams 110 formed on adjustment shaft 114. Shaft 114 is journalled in a calibration block which is secured to housing 102 by a calibration screw (not illustrated). A rotational force may be applied manually, or otherwise, to shaft 114 via adjustment lever 116 which is affixed to the end thereof. Leg 104b, block 106, cams 110, shaft 114 and lever 116 together make up a first linkage.

Lever 120 is pivotable about shaft 124 and journalled within the side walls of housing 102 to convert the vertical movement of bimetallic element 104 caused by temperature variations into horizontal movement. A bleed plate 130 having an opening 132 therein is provided to override bleed port 134 formed within housing 102. To obtain a compact thermostat, a short bimetallic element is utilized. Lever 120 is therefore provided with arms 121 and 122 of unequal lengths measured from the axis of shaft 124. The short arm, 121, contacts leg 104a of bimetallic element 104 while the long arm, 122, contacts bleed plate 130. This provides a relatively large horizontal movement of the bleed plate 130 to compensate for the relatively small vertical movement resulting from the use of a short bimetallic element. To obtain the necessary force against arm 121, bimetallic element 104 has a greater thickness than bimetallic elements normally employed in a thermostat of this type. A spring 140 is suitably affixed to housing 102 and is provided to bias plate 130 toward lever 120. Leg 104a, shaft 124, arms 121 and 122 of lever 120 and bleed plate 130 together make up a second linkage.

Bleed port 134 communicates with an air passage 142 within housing 102. An opening 144 within housing 102, communicating with passage 142, is provided for receiving a suitable pressure regulator to provide regulated control pressure to bleed port 134. For a description of a suitable pressure regulator, reference may be had to U.S. Pat. No. 3,434,409. Air is bled from the regulator through bleed port 134 to provide a variable air pressure at the bladders or bellows (not illustrated) controlling the inflation of the bellows and thereby the flow of conditioned air into the room/zone in response to temperature variations in the area being treated.

Figure 8:
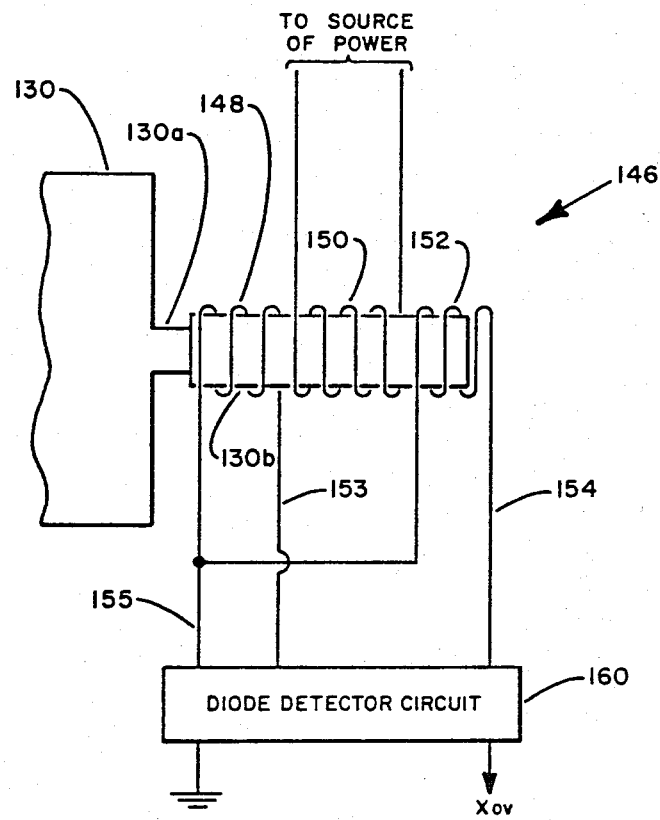
FIG. 8 is a schematic representation of the thermostatic transducer.

The thermostat portion of the structure designated by numeral 100, to the extent to which it has been described, is conventional for use as a bleed thermostat. To convert the thermostat into a transducer, the bleed plate 130 is provided with an extension 130a having a magnetic member 130b thereon for use as a transformer core and is a movable core for differential transformer 146. Referring now to FIG. 8, the extension 130a extends into transformer 146 which has two secondary windings 148 and 152 and primary winding 150. Primary winding 150, which is located between and overlapped by the two secondary windings 148 and 152 around the core 130b carried by extension 130a, is connected to a source of AC power. The two spaced apart secondary windings 148 and 152 are connected by separate leads 153 and 154 at one of their ends and a common lead 155 from their opposite ends to a diode detector circuit 160. When the core defined by member 130b is moved closer to one secondary winding than the other, it couples more magnetic flux into one winding, and the output from this secondary winding, or the difference between the two secondary windings, is varied by an amount proportional to the amount of linear travel of the core 130b. The alternating current signal from the secondary windings is converted to a direct current signal by diode detector circuit 160. This voltage, Xov,, is supplied to thermostatic transducer 24-1 and represents the position of the bleed plate extension 130a. It follows that the position of the bleed plate extension 130a is also indicative of the position of bleed plate 130 and opening 132 and therefore provides a reading of terminal satisfaction/dissatisfaction. A terminal is satisfied unless bleed port 134 is in full registration with opening 132. Full registration of port 134 with opening 132 would imply that the temperature in the zone is higher than the set point in the cooling mode or less than the set point in the heating mode.

Referring now to FIG. 5, branch duct pressure, Pd1 is supplied as a first input to the bellows for determining the bellows orifice characteristic represented by box 42. The bellows inflation pressure, Pb1, is supplied as a second input to the bellows for determining bellows orifice characteristic 42. The bellows orifice characteristic in the form of the bellows orifice cross sectional area is thus actually determined by the bellows inflation which results from the difference between duct pressure, Pd1, and a modified duct pressure in the form of bellows supply or inflation pressure, Pb1. The branch duct pressure, Pd1, forces supply air across the bellows orifice cross sectional area to result in an output CFM. The output, CFM, representative of the flow through the terminal is supplied to room 43. In determining the heat balance of room 43 the CFM is supplied as a first input to the room space represented by block 44 and the difference, $\Delta T$, between the supply air temperature, Tsa, and the temperature of the space near the terminal, Tt1, acts on the CFM as a second input to the room space represented by block 44 which has an "output" Qin, which represents the cooling/heating delivered to the room 43. Qin is equal to the product of CFM, the density of the air, the specific heat of the air and $\Delta T$. The room heat balance is represented by block 46 which receives a first input, Qin, representing the cooling/heating delivered to the room and a second input, Qload, representing the heating/cooling load of the room. The difference between Qin and Qload is Qnet which represents the net or accumulated heating/cooling in the room. Qnet is acted upon by the room characteristic represented by box 47 which is the product of room mass, thermal capacitance, and the derivative of temperature with respect to time (dT/dt) which results in temperature Tt1 which is supplied as a first input to subtractor 50. The supply air temperature, Tsa, is supplied as a second input to subtractor 50 and the output, $\Delta T$, is supplied as an input to room space 44 as described above. The space temperature near the terminal, Tt1, acts on the bimetal, 104, of the bleed thermostat which positions itself accordingly in response to thermal expansion due to the bimetal expansion coefficient represented by box 52 and the bimetal position, Xt, is supplied by a first input to summing junction 54. The temperature set point, Tsp1, of the zone is supplied by positioning lever 116 (FIG. 7) and serves as an input to thermostat dial 62. The thermostat dial 62 produces an output, Xtab, representing the scale graduation position of the bleed thermostat 100 which positions the first linkage 64 of the bleed thermostat 100 made up of members 104b, 106, 110, 114 and 116. The linkage 64 has an output, Xsp, representing the position of bleed thermostat bleed plate opening 132 which is supplied as a second input to summing junction 54. The output of summing junction 54 is Xb and represents the net position of the first linkage 64 and is supplied to the second linkage 70 made up of members 104a, 124, 120 and 130 and causes second linkage 70 to move a distance Xo. Movement of linkage 70 causes the movement of bleed plate 130 containing opening 132 and extension 130a. The movement Xo of bleed plate extension 130a is converted to a voltage Xov, as discussed above with respect to FIG. 8, and is supplied as a first input to summing junction 72 in thermostatic transducer 24-1. A second input Xmax represents the position of bleed plate 130 which will permit the maximum bleed through opening 132 and is supplied as the second input to summing junction 72. The output Xnet of summing junction 72 represents the difference between the current position of bleed plate 130 and the critical position which allows the maximum bleed flow and thus represents how much more the opening 132 can be uncovered. Xnet is supplied to function generator 74 which, responsive thereto produces a binary (digital) output, DT1, of either $\phi$ or 1 which is supplied to controller 26 and indicates whether or not the terminal is satisfied. The control logic of controller 26 receives the outputs from all of the tranducers 24-1 to n which are located in terminals around the duct system. The inputs are used according to the selected algorithm to provide the decision basis for controlling the air handler/fan. The movement, Xo, of linkage 70 also produces a slot orifice geometric relation represented by box 56 which has an output, Ao, representative of the orifice cross-sectional area which is equal to Xo times the mean length, or diameter depending upon the shape, of opening 132 and is supplied as a first input for determining the slot orifice characteristic represented by block 58. The pressure regulator set point (in CFM), CFMsp, is supplied as a first input to processor 60 and branch duct pressure Pd1 is supplied as a second input which establishes a pressure regulator coefficient relationship and produces an output, Pi, representative of an intermediate pressure, which is supplied as a second input to block 58. In block 58 an output, Pb1, is produced which is representative of the bellows inflation pressure and is supplied to determine bellows orifice characteristic 42, as described above.

Although preferred embodiments of the present invention have been specifically illustrated and described in terms of a variable speed fan with a speed changer, other changes will occur to those skilled in the art such as the use of fans having inlet guide vanes or control pitch axial fans. For example, other forms of thermostatic transducers may be used. It should be obvious that the air terminals are still selected to match the peak zone loads. It is therefore intended that the scope of the present invention is to be limited only by the scope of the appended claims.

What is claimed is:

1. A variable air volume distribution system for conditioned air comprising:
   duct means including a main duct and a plurality of branches;
   fan means for supplying variable amounts of conditioned air to said duct means;
   means for controlling the amount of conditioned air supplied by said fan means;
   at least one variable air volume terminal means connected to each of said branches for variably controlling the amount of conditioned air continuously supplied by each of said branches to its related zone; and
   means for determining terminal satisfaction for at least one of said terminal means connected to each of said branches and for regulating said means for controlling the amount of conditioned air supplied responsive to terminal satisfaction and including means for maintaining the number of dissatisfied terminals within a predetermined range whereby a minimum acceptable output for said fan means is maintained.

2. A variable air volume distribution system for conditioned air comprising:
   duct means including a main duct and a plurality of branches;
   fan means for supplying variable amounts of conditioned air to said duct means;

means for controlling the amount of conditioned air supplied by said fan means;

at least one variable air volume terminal means connected to each of said branches for variably controlling the amount of conditioned air continuously supplied by each of said branches to its related zone; and means for determining terminal satisfaction for at least one of said terminal means connected to each of said branches and for regulating said means for controlling the amount of conditioned air supplied responsive to terminal satisfaction and including means for periodically reducing the output of said fan means when a predetermined number of terminals are satisfied whereby a minimum acceptable output for said fan means is maintained.

3. A method for variably controlling the distribution of conditioned air comprising the steps of:

supplying conditioned air to a plurality of zones;

determining terminal satisfaction by sampling at least on terminal in each zone;

variably controlling the amount of conditioned air supplied to each of the plurality of zones responsive to terminal satisfaction by:
 (a) determining the number of dissatisfied terminals;
 (b) comparing the number of dissatisfied terminals to a first predetermined number;
 (c) if the number of dissatisfied terminals is greater than or equal to the first predetermined number, increasing the amount of conditioned air supplied to the plurality of zones; and
 (d) if the number of dissatisfied terminals is less than the second predetermined number, decreasing the amount of conditioned air supplied to the plurality of zones.

4. The method of claim 3 further including the step of maintaining the amount of conditioned air supplied as long as the number of dissatisfied terminals is less than the first predetermined number and greater than the second predetermined number.

5. A method for variably controlling the distribution of conditioned air comprising the steps of:

supplying conditioned air to a plurality of zones;

determining terminal satisfaction by sampling at least one terminal in each zone;

variably controlling the amount of conditioned air supplied to each of the plurality of zones responsive to terminal satisfaction by:
 (a) periodically determining if there are any dissatisfied terminals;
 (b) if there are no dissatisfied terminals, periodically reducing the amount of conditioned air supplied until at least one terminal is dissatisfied; and
 (c) if any of the terminals is dissatisfied, periodically increasing the amount of conditioned air supplied until all of the terminals are satisfied.

* * * * *